(12) United States Patent
Voegele et al.

(10) Patent No.: US 10,746,209 B2
(45) Date of Patent: Aug. 18, 2020

(54) ADJUSTABLE CLAMP

(71) Applicant: RETRAX HOLDINGS, LLC, Ann Arbor, MI (US)

(72) Inventors: Tyler Alyce Voegele, South Grand Forks, ND (US); Jerry Oye, Fargo, ND (US)

(73) Assignee: RETRAX HOLDINGS, LLC, Ann Arbor, MI (US)

( * ) Notice: Subject to any disclaimer, the term of this patent is extended or adjusted under 35 U.S.C. 154(b) by 162 days.

(21) Appl. No.: 16/103,232

(22) Filed: Aug. 14, 2018

(65) Prior Publication Data
US 2020/0056639 A1    Feb. 20, 2020

(51) Int. Cl.
| | | |
|---|---|---|
| *B60P 7/02* | (2006.01) | |
| *F16B 2/12* | (2006.01) | |
| *B60J 7/19* | (2006.01) | |
| *B60J 7/14* | (2006.01) | |
| *F16B 2/06* | (2006.01) | |

(52) U.S. Cl.
CPC ............... *F16B 2/12* (2013.01); *B60J 7/141* (2013.01); *B60J 7/198* (2013.01); *F16B 2/065* (2013.01)

(58) Field of Classification Search
CPC ... H01L 2924/0002; H01R 4/38; A47B 97/04; A47G 21/10; A47J 43/283; B60J 7/102; B60J 7/198; B60J 7/141; B60J 7/104; F16B 2/185; B60P 7/04
USPC .................................................. 296/100.04
See application file for complete search history.

(56) References Cited

U.S. PATENT DOCUMENTS

| 804,342 | A | * | 11/1905 | Randall | ..................... B25B 1/20 269/217 |
|---|---|---|---|---|---|
| 1,241,459 | A | * | 9/1917 | Woodward | ............... B61K 7/20 188/45 |
| 2,169,064 | A | * | 8/1939 | Williams | ................ B25B 5/101 269/245 |
| 2,472,022 | A | * | 5/1949 | Neal | ....................... B25B 5/101 269/157 |
| 4,730,866 | A | * | 3/1988 | Nett | ......................... B60J 7/104 296/100.18 |
| 4,838,602 | A | * | 6/1989 | Nett | ......................... B60J 7/104 296/100.18 |

(Continued)

FOREIGN PATENT DOCUMENTS

WO        2017/070786 A1     5/2017

*Primary Examiner* — Kiran B Patel
(74) *Attorney, Agent, or Firm* — The Dobrusin Law Firm, P.C.

(57) ABSTRACT

A clamp comprising: (a) one or more rail clamps that are configured to contact one or more rails of a tonneau system; (b) one or more bed clamps that are configured to contact a bed flange of a bed of a vehicle, the one or more bed clamps being movable relative the one or more rail clamps so that a space between the one or more rail clamps and the one or more bed clamps can be increased and decreased, the one or more bed clamps each including: (i) a contact portion that when in a locked position has both a vertical contact location where the contact portion contacts a vertical portion of the bed flange and a horizontal contact location where the contact portion contacts a horizontal portion of the bed flange; and (ii) a movement leg in communication with the contact portion, the movement leg supporting the contact portion so that the contact portion is vertically movable relative to the movement leg.

20 Claims, 6 Drawing Sheets

(56) References Cited

U.S. PATENT DOCUMENTS

| | | | | |
|---|---|---|---|---|
| 4,846,431 | A * | 7/1989 | Pflieger | F16B 2/065 248/228.4 |
| 4,901,963 | A * | 2/1990 | Yoder | B25B 5/103 24/489 |
| 4,953,820 | A * | 9/1990 | Yoder | B25B 5/103 24/489 |
| 5,131,780 | A * | 7/1992 | Love | B25B 5/101 24/522 |
| D328,845 | S * | 8/1992 | Yoder | D8/72 |
| D329,007 | S * | 9/1992 | Yoder | D8/73 |
| 5,228,739 | A * | 7/1993 | Love | F16B 2/065 248/229.24 |
| D339,782 | S * | 9/1993 | Yoder | D12/223 |
| D340,018 | S * | 10/1993 | Yoder | D12/223 |
| 5,261,719 | A * | 11/1993 | Tucker | B60J 7/104 224/405 |
| 5,275,458 | A * | 1/1994 | Barben | B60J 7/104 160/379 |
| 5,301,913 | A * | 4/1994 | Wheatley | B60R 9/00 248/231.41 |
| 5,310,238 | A * | 5/1994 | Wheatley | B60J 7/104 296/100.18 |
| D358,798 | S * | 5/1995 | Miller | D12/223 |
| 5,460,423 | A | 10/1995 | Kersting et al. | |
| D364,792 | S * | 12/1995 | Yoder | D12/223 |
| 5,487,585 | A * | 1/1996 | Wheatley | B60J 7/104 160/368.1 |
| 5,540,475 | A * | 7/1996 | Kersting | B60J 7/185 224/331 |
| D375,440 | S * | 11/1996 | Yoder | D8/73 |
| 5,586,373 | A * | 12/1996 | Eby | B25B 1/103 24/525 |
| 5,655,808 | A * | 8/1997 | Wheatley | B60P 7/0815 248/227.1 |
| 5,765,902 | A * | 6/1998 | Love | B60J 7/104 248/228.1 |
| 5,788,315 | A * | 8/1998 | Tucker | B60J 7/102 160/395 |
| 5,873,688 | A * | 2/1999 | Wheatley | B60P 7/0815 410/101 |
| 5,975,618 | A | 11/1999 | Rippberger | |
| 6,032,939 | A * | 3/2000 | Chen | B25B 1/103 269/249 |
| 6,109,681 | A * | 8/2000 | Edwards | B60J 7/1621 296/100.02 |
| 6,547,311 | B1 * | 4/2003 | Derecktor | B60P 7/0815 248/229.13 |
| 6,575,520 | B1 * | 6/2003 | Spencer | B60J 7/085 296/100.01 |
| 6,708,966 | B1 * | 3/2004 | Troudt | B25B 5/067 269/249 |
| 6,752,449 | B1 * | 6/2004 | Wheatley | B60J 7/102 296/100.17 |
| 6,811,203 | B2 * | 11/2004 | Wheatley | B60J 7/102 296/100.15 |
| 6,942,266 | B1 * | 9/2005 | Van Sickle | B66C 1/62 294/104 |
| 7,011,284 | B2 * | 3/2006 | Melius | B60J 7/104 248/229.11 |
| 7,014,400 | B1 * | 3/2006 | LaBelle | B60P 7/0815 410/104 |
| 7,258,387 | B2 | 8/2007 | Weldy | |
| 7,497,493 | B1 * | 3/2009 | Thiessen | B60P 7/15 296/3 |
| 7,628,442 | B1 * | 12/2009 | Spencer | B60J 7/104 24/455 |
| 7,753,425 | B2 | 7/2010 | Niedziela et al. | |
| 8,480,154 | B2 | 7/2013 | Yue | |
| 8,807,625 | B2 | 8/2014 | Garska | |
| 9,073,495 | B2 | 7/2015 | Toutant | |
| RE45,825 | E * | 12/2015 | Magno, Jr. | F16B 2/10 |
| 9,248,784 | B2 | 2/2016 | Kraeuter et al. | |
| 9,249,813 | B2 | 2/2016 | Kalman | |
| 9,429,177 | B2 * | 8/2016 | Parrenin | F16B 9/023 |
| 9,486,897 | B2 * | 11/2016 | Trotsky | B25B 5/006 |
| 9,533,555 | B2 | 1/2017 | Facchinello et al. | |
| 9,545,835 | B2 | 1/2017 | Facchinello et al. | |
| 9,630,479 | B2 | 4/2017 | Facchinello et al. | |
| 9,676,319 | B2 | 6/2017 | Fink | |
| 9,764,628 | B2 | 9/2017 | Facchinello et al. | |
| 9,951,904 | B2 | 4/2018 | Perez et al. | |
| 2002/0180235 | A1 * | 12/2002 | Wheatley | B60J 7/102 296/100.16 |
| 2003/0057726 | A1 * | 3/2003 | Wheatley | B60J 7/102 296/100.18 |
| 2008/0054037 | A1 | 3/2008 | Niedziela et al. | |
| 2008/0179911 | A1 * | 7/2008 | Spencer | B60J 7/085 296/100.17 |
| 2009/0274531 | A1 * | 11/2009 | Townson | B60P 7/0815 410/104 |
| 2012/0274092 | A1 | 11/2012 | Yue | |
| 2015/0061315 | A1 | 3/2015 | Facchinello et al. | |
| 2015/0130212 | A1 | 5/2015 | Spencer | |
| 2016/0263974 | A1 * | 9/2016 | Xu | B60J 7/085 |
| 2017/0066311 | A1 * | 3/2017 | Facchinello | B60J 7/198 |
| 2017/0144520 | A1 * | 5/2017 | Hemphill | B60R 13/01 |
| 2017/0144522 | A1 | 5/2017 | Facchinello et al. | |
| 2018/0093555 | A1 | 4/2018 | Aubrey et al. | |
| 2018/0118008 | A1 * | 5/2018 | Facchinello | B60J 7/198 |
| 2018/0126833 | A1 * | 5/2018 | Hannan | B60J 10/90 |
| 2019/0061497 | A1 * | 2/2019 | Trinier | B60J 7/198 |
| 2019/0070940 | A1 * | 3/2019 | Titus | B60J 7/141 |

* cited by examiner

ADJUSTABLE CLAMP

FIELD

The present teachings relate to a vehicle bed cover that is connected the vehicle bed by one or more adjustable clamps and specifically an adjustable clamp that makes two points of contact with a bed flange.

BACKGROUND

Tonneau systems cover an open area of a vehicle and generally cover an open area of a pick-up truck (i.e., a bed). Multiple different types of tonneau systems are available, with some of the tonneau covers being solid and opening about a pivot, some folding upon themselves, and others rolling up. Many of these tonneau covers include a rail that is connected to the bed and the tonneau cover connects to the bed when the tonneau cover is in the closed position. The rails are connected to the bed with a clamp.

Examples of tonneau systems and/or clamps are found in U.S. Pat. Nos. 4,901,963; 5,228,739; 5,540,475; 5,655,808; 5,975,618; 7,011,284; 7,628,442; and 9,764,628 all of which are expressly incorporated herein by reference for all purposes. It would be desirable to have clamp that contacts two or more points and preferably two or more walls of the bed flange. What is needed is a clamp that is height adjustable to extend around a truck flange while being connected to the rail. It would be desirable to have a support arm that prevents rotation of the clamp when the clamp is connected to the rail and the bed flange. What is needed is a contact leg that is contoured to contact two or more locations of a bed flange, a rail, or both.

SUMMARY

The present teachings seek to help solve one or more of the problems/issues disclosed above. The present teachings are particularly directed to regulating movement of the truck bed cover relative to the truck bed.

Accordingly, pursuant to one aspect of the present teachings provide: a clamp comprising: (a) one or more rail clamps that are configured to contact one or more rails of a tonneau system; (b) one or more bed clamps that are configured to contact a bed flange of a bed of a vehicle, the one or more bed clamps being movable relative the one or more rail clamps so that a space between the one or more rail clamps and the one or more bed clamps can be increased and decreased, the one or more bed clamps each including: (i) a contact portion that when in a locked position has both a vertical contact location where the contact portion contacts a vertical portion of the bed flange and a horizontal contact location where the contact portion contacts a horizontal portion of the bed flange; and (ii) a movement leg in communication with the contact portion, the movement leg supporting the contact portion so that the contact portion is vertically movable relative to the movement leg.

The present teachings provide a clamp that contacts two or more points and preferably two or more walls of the bed flange. The present teachings provide a clamp that is height adjustable to extend around a truck flange while being connected to the rail. The present teachings provide a support arm that prevents rotation of the clamp when the clamp is connected to the rail and the bed flange. The present teachings provide a contact leg that is contoured to contact two or more locations of a bed flange, a rail, or both.

DETAILED DESCRIPTION

Figure 1A:
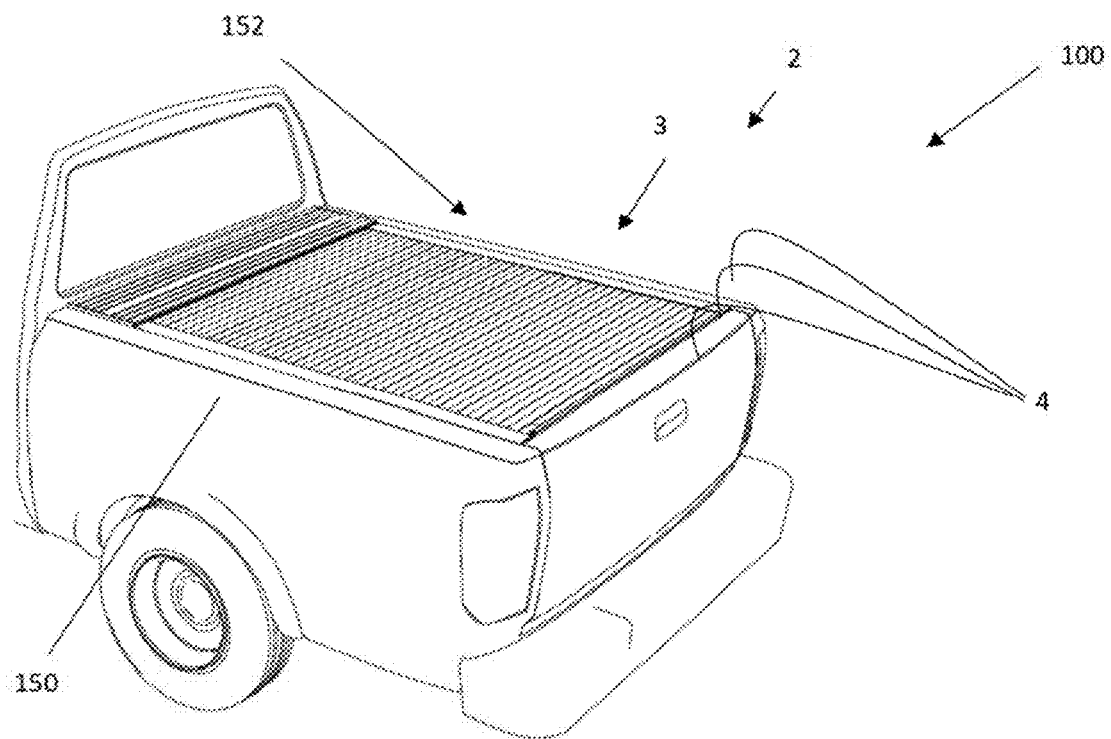
FIG. 1A is a perspective view of a vehicle with a tonneau system in a closed position.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The tonneau system (tonneau system) functions to cover an open area and prevent fluid, debris, dirt, or a combination thereof form entering the open area (e.g., a bed of a pick-up truck, and hereinafter "bed"). The tonneau system may function to lock a bed so that items may be stored within the bed. The tonneau system may be collapsible so that items may be placed within the bed without interference from the tonneau system. The tonneau system may fold upon itself to expose the bed. The tonneau cover may roll up or roll into a canister that stores the tonneau cover of the tonneau system. The tonneau cover may be a plurality of tonneau sections that are connected together. The tonneau cover may be connected to a rail on a first side and a rail on a second side. The rail and the tonneau cover may be connected to the bed, a bed flange, or both on a first side (passenger side), a second side (driver side), or both. The tonneau system may include one or more tonneau sections and preferably a plurality of tonneau sections.

The tonneau sections (i.e., section) function to connect together to create one contiguous surface. The tonneau sections may lock together. The tonneau sections may be longitudinally movable, rotationally movable, or both relative to other tonneau sections. The tonneau sections when in a closed position may prevent fluid, debris, dirt, or a combination thereof from entering a bed. The tonneau sections may be separate pieces. The one or more tonneau sections may be connected together to extend within a first plane. The one or more tonneau sections may extend along a first plane when the tonneau sections are in a closed position. The one or more tonneau sections may extend from the first plane and into the canister when the tonneau sections are moved into the stored position. The tonneau sections may be a plurality of sections that are flexible so that the tonneau sections may mirror the shape of the rails, the tracks, or both as the tonneau cover moves between a closed position and a stored position into or out of a canister.

The one or more canisters may function to store the tonneau sections when the tonneau sections are moved from a closed position to a stored position. The one or more canisters may be located below a top of the truck bed. The one or more canisters may extend into a truck bed, through a truck bed, or both. The one or more canisters may include one or more tracks. The one or more tracks in the canister may permit the tonneau sections to curve or bend within the canister so that the tonneau sections are stored and protected. The one or more canisters may angle the tonneau sections so that the tonneau sections are stored and are controllably moved into the canister. The one or more canisters may be connected to a bed, a forward wall of a bed, one or more side walls of a bed, rails, or a combination thereof. Preferably, the canister is connected only to the rails. The canister may include one or more tracks that receive and assist in storing the tonneau cover in the canister.

The one or more tracks function to guide the tonneau cover into and out of the canister. The one or more tracks may prevent a first portion (e.g., an inner section) of a tonneau cover from contacting a second portion (e.g., an outer section) of a tonneau cover. The one or more tracks may assist in storing the tonneau cover. The one or more tracks may assist is slowing the tonneau cover as the tonneau cover extends into the canister. The one or more tracks may be or include a section that is generally circular, oval, "U" shaped, "C" shaped, or a combination thereof. The one or more tracks may have two portions that are parallel to each other. The one or more tracks may have two portions that are converging. For example, an inner track and an outer track may be angled such that the inner track and the outer track converge towards each other. The one or more tracks may have two portions that are diverging. The track may extend to the bed. The track may guide a portion of the tonneau cover parallel to the bed. The one or more tracks may have one or more segments. Preferably, the track has a plurality of segments that control movement of the tonneau cover within the canister. The track may be scroll shaped. The track may include one or more outer tracks, one or more inner tracks, one or more curved tracks, a track one, a track two, a track three, or a combination thereof. The tracks of the canister may align with one or more roller tracks within each of the one or more rails.

The one or more rails function to connect to a bed of a vehicle, allow the tonneau cover to move between a closed position and a stored position, to support one or more rollers of a tonneau cover, or a combination thereof. The one or more rails may extend parallel to the bed and be connected to the bed. The one or more rails may be held in communication with the bed by one or more clamps. The one or more rails may extend from a forward end of a bed to a rear end of a bed. The one or more rails may have a length substantially equal to a length of a bed. The one or more rails may connect a tonneau cover to a bed and a canister. A first rail may extend along a driver side and a second rail may extend along a passenger side of a bed. The rails may connect a first side of a tonneau cover to a first side of a bed and a second side of a tonneau cover to a second side of a bed. The rails may include one or more flanges that may be connected by one or more clamps and preferably a rail clamp. The rails may include one or more roller tracks that receive one or more rollers of the tonneau cover, one or more accessory ports that receive an accessory or an accessory attachment; or both.

The one or more accessory ports may function to receive an accessory, an accessory attachment, or both so that an accessory may be connected to the rails, the cover, or both. The one or more accessory ports may be a recess in a rail, a recess in a cover, or both. The one or more accessory ports may receive an accessory attachment so that an accessory may be connected to the rails, the cover, or both. The one or more accessory ports may be any slot that receives an accessory attachment so that an accessory can be connected to the tonneau system. The accessory port may be a "T" slot or a "T" groove that receives an accessory attachment. The one or more accessory ports may be located above, over, proximate to, or a combination thereof the roller tracks.

The one or more roller tracks may function to receive one or more rollers of the tonneau cover so that the one or more rollers are movable along the bed between a closed position and a stored position. The one or more roller tracks may be a channel, a groove, a recess, an aperture, or a combination thereof. The one or more roller tracks may be generally "C" shaped, generally "U" shaped, or both so that as a roller moves within a roller track the roller is maintained within the roller track and guides the tonneau cover. The one or more roller tracks may be a single roller track in each rail. The roller tracks may be parallel to a direction of movement of a tonneau cover so that the tonneau cover is movable into the canister and out of the canister. The roller track (e.g., rail) and track (e.g., canister) may be connected together by one or more clamps. The tonneau cover may move longitudinally along the bed, the roller track, the track, or a combination thereof. The clamps may prevent movement of the rails, longitudinal movement of the rails, lateral movement of the rails, rotational movement of the rails, vertical movement of the rails, or a combination thereof as the tonneau cover moves along the roller tracks. For example, when an accessory is added to the cover, the clamps prevent the cover, the rails, the accessory, or a combination thereof from being moved in a vertical direction (e.g., upward out of the bed).

The one or more clamps may function to connect the tonneau system, tonneau cover, rails, or a combination thereof to a bed of a vehicle. The one or more clamps may fixedly connect the one or more rails to the bed, a bed flange, or both. The one or more clamps may contact the bed and the one or more rails and hold one of the rails in contact with the bed. The one or more clamps may be sufficiently strong so that a cover, a supporting bar (e.g., a device that is connected to a rail, a cover, or both via an accessory port), or both may support one or more accessories having a total weight of about 25 Kg or more, about 50 Kg or more, or even about 75 Kg or more. The clamps may be sufficiently strong so that the cover, the supporting bars, the rails, or a combination thereof can support one or more articles in compliance with ISO/PAS 11154 (first edition Dec. 15, 2006), the teachings of which are expressly incorporated by reference herein for all purposes. The one or more clamps may create a connection that supports bicycles, kayaks, skis, a motorcycle, snowboards, sailboards, surfboards, one or more roof containers, canoes, lay out boats, wind deflectors, ladders, roof decks, or a combination thereof. The one or more clamps may prevent deflection or flexing of the cover, the rails, or both. The one or more clamps may prevent longitudinal movement, lateral movement, vertical movement, rotational movement, or a combination thereof of the rails, the cover, or both when the cover is locked in a predetermined position (e.g., open or closed). The one or more clamps may include a rail clamp (e.g., on a first side) and a bed clamp (e.g., on a second side) that are movable relative to each other to create a clamping force. The rail clamp and the bed clamp may be movable relative to each other. The rail clamp and the bed clamp may move to adjust a space therebetween. The rail clamp, the bed clamp, or both may be movable. Preferably, the rail clamp is static and the bed clamp is movable so that a space between the rail clamp and the bed clamp may be increased and decreased. The clamp may be movable vertically to change a height of the rail clamp, the bed clamp, or both. The clamp may be movable longitudinally (e.g., in a direction along an axis) to increase or decrease a space between the rail clamp and the bed clamp. The space may be sufficiently large so that both the rail and a portion of the bed (e.g., bed flange) fit within the space so that the rail clamp and the bed clamp when moved together connect the rail and the portion of the bed. The space may be adjustable by moving a fastener that moves the rail clamp, the bed clamp, or both axially along the fastener. The space may be adjusted by longitudinally moving a portion the clamp. Preferably, the space is adjusted by longitudinally moving the bed clamp relative to the rail clamp.

The rail clamp may function to contact the rail to hold the rail into contact with the bed, the bed flange, or both. The rail clamp may be immobile relative to a fastener, the bed clamp, or both so that the rail clamp supports the fastener and the bed clamp. The rail clamp, may be made of one or more pieces. Preferably, the rail clamp is one solid piece. The rail clamp may be or include a portion that is "C" shaped, "L" shaped, "T" shaped, or a combination thereof. The rail clamp may have a portion that is located on a first side of the rail, a second side of the rail, extends under the rail, or a combination thereof. The rail clamp may have a portion that extends parallel to, perpendicular to, or both the bed flange, the rail, the roller track, or a combination thereof. The rail clamp may include one or more gripping portions, one or more teeth, one or more extension arms, one or more adjustment arms, one or more rotation arms, or a combination thereof.

The one or more gripping portion may function to form a connection with the rail so that the rail is retained in a locked position, prevented from moving, or both. The griping portion may be in direct contact with the rail, a flange or the rail, or both. The gripping portion may prevent movement of the rail vertically, laterally (e.g., towards an opposing side of the bed), longitudinally, or a combination thereof. The gripping portion may be a single surface that contacts the rail or rail flange. The rail clamp may include a plurality of gripping portions that assist in forming a connection between the rail, the rail flange, or both and the rail clamp. The gripping portion may be smooth, jagged, a high friction surface (e.g., sand paper), include one or more points of contact, a plurality points of contact, a raised surface, a complementary surface to the rail or rail flange, or a combination thereof. The gripping portion may be a plurality of teeth.

The plurality of teeth may function to contact a plurality of adjacent teeth to restrict movement. The teeth may be part of a gripping portion, a locking portion, or both. The teeth may be located on the rail clamp, the bed clamp, the movement leg, the gripping portion, the contact leg, the locking portion, or a combination thereof. The teeth may extend at angle so that when the teeth are in contact with an adjacent structure the teeth assist in preventing movement of the adjacent structure. For example, when the teeth on the movement leg are in contact with teeth on the contact leg the teeth prevent movement of the movement leg relative to the contact leg and vice versa. The teeth on the gripping portion may grip a bed, bed flange, rail, or a combination thereof and prevent movement of the bed, bed flange, rail, or a combination thereof relative to the clamp. The plurality of teeth may assist in forming a connection between the rail clamp and the rail so that the rail is prevented from moving. The one or more teeth may be raised from the gripping portion so that a fixed connection is created with the rail. The one or more teeth may have an angle of about 120 degrees or less, about 110 degrees or less, or about 100 degrees or less when measured from a first side of a tooth to a second side of a tooth. The one or more teeth may extend at an angle of about 50 degrees or more, about 75 degrees or more, or about 90 degrees or more when measured from a first side of a tooth to a second side of a tooth. A surface of each tooth (e.g., upper surface, lower surface, or both) may extend at an angle relative to a rear surface of the locking portion. A surface of the tooth may extend at an angle of about 90 degrees or more, about 100 degrees or more, about 125 degrees or more, or about 135 degrees or more relative to a rear surface of the locking portion. A surface of each tooth may extend at an angle of about 180 degrees or less, about 165 degrees or less, or about 150 degrees or less relative to a rear surface of the locking portion. The teeth, the gripping portion, or both may be located on or connected to an extension arm.

The one or more extension arms function to align the one or more gripping portions with the rail, a rail flange, or both. The one or more extension arms may extend the gripping portion around the rail flange, the rail, or both so that the gripping portion may contact the rail, rail flange, or both. The one or more extension arms may space the gripping portion away from an adjustment arm. The one or more extension arms may extend away from a bottom of a bed, parallel to a side, vertically, or a combination thereof. The one or more extension arms may be located directly below the gripping portion, in a same plane as a gripping portion, in line with a gripping portion, or a combination thereof. The gripping portion may extend outward away from the extension arm so that the extension arm is free of interference with the gripping portion, making a connection, or both. The extension arms may be connected to one or more adjustment devices. The extension arms may ground one or more adjustment devices. For example, the adjustment arms may form a connection with an adjustment device which may be a threaded fastener that a bed clamp moves along. The extension arm may include one or more apertures, through holes, or both. The extension arms may support an adjustment device that extends cantilever from the extension arm. The extension arms may extend parallel to a movement leg, a contact portion, or both. The extension arms may assist in moving the bed clamp, adjusting a space between the rail clamp and the bed clamp, or both. The extension arm may extend at an angle relative to the adjustment arm.

The one or more adjustment arms may function to support the extension arm. The one or more adjustment arms may be static and all or a portion of the bed clamp may move relative to the adjustment arms, along the adjustment arms, or both. The one or more adjustment arms may be fixedly connected to the one or more extension arms. The one or more adjustment arms and the one or more extension arms may be generally perpendicular to each other (e.g., form an angle from perpendicular of about ±5 degrees or less, ±3 degrees or less, or about ±1 degree or less). The one or more adjustment arms may extend under a rail, a bed flange, a side of the bed, or a combination thereof. Preferably the adjustment arms extend from a first side of the rail, the bed flange, or both to a second side of the rail, the bed flange, or both. For example, the adjustment arm may extend from a location proximate to a side of the bed to a location towards an opposing side of the bed. The one or more adjustment arms may support both the extension arm and the bed clamp. The one or more adjustment arms may support the bed clamp as the bed clamp is moved along the adjustment arm, between an open position and a closed position, or both. The one or more adjustment arms may include one or more grooves that the bed clamp moves along. The one or more adjustment arms may be smooth and the bed clamp may slide along the adjustment arm. The adjustment arm may extend parallel to an adjustment device. A maximum space the clamp opens may be equal to or less than a length of the adjustment arms. The adjustment arms may be a main portion of the clamp. The adjustment arms may support one or more rail clamps, one or more bed clamps, one or more rotation arms, or a combination thereof.

The one or more rotation arms may function to stabilize the clamp, prevent rotation of the clamp, prevent movement of the bed or bed flange relative to the rail, or a combination thereof. Maintain the bed flange and the rail in a fixed position once the bed flange and the rail are connected by the clamp. The one or more rotation arms may extend from a lower surface of the rail clamp, from a side of the rail clamp opposite the extension arm, or both. The one or more rotation arms may be located between the extension arm and the bed clamp. The one or more rotation arms may be movable. Preferably, the one or more rotation arms are static. The rotation arm may connect to a support arm, a positioner support, or both. The rotation arm may extend cantilever from a bottom of the rail clamp, the adjustment arm, or both. The rotation arm may include one or more holes, apertures, adjustment cavities, or a combination thereof that receive one or more positioner supports, support arms, or both. The one or more rotation arms may assist in supporting the clamp, the cover, the rail, or a combination thereof when a mass, weight, an accessory, supporting bar, or a combination thereof are placed on or connected to the rotation arm. The one or more rotation arms may restrict movement of the rail clamp, the bed clamp, or both when the clamp is in a locked state or locked position.

The bed clamp may function to connect the clamp to a bed of a vehicle, a bed flange of a vehicle, or both. The bed clamp may create a fixed connection with the bed or bed flange so that the bed, bed flange, or both and the rail are sandwiched between the rail clamp and the bed clamp to connect a tonneau system to a bed. The bed clamp may contact one or more walls of the bed, bed flange, or both. The bed clamp may contact a vertical wall, a horizontal wall, or both of a bed, a bed flange, or both. The bed clamp may extend under a wall of the bed, into a recess within the bed, or both. The bed clamp may connect the clamp to a side of a bed so that a part of the tonneau system is connected to a vehicle. The bed clamp may be one solid piece. The bed clamp may be multiple pieces. The bed clamp may include a movement leg and a contact leg. The movement leg and the contact leg may be a single piece. The movement leg and the contact leg may be movable relative to each other.

The movement leg may function to assist the bed clamp in moving relative to the rail clamp. The movement leg may be indirectly connected to the rail clamp, the extension arm, or both. The movement leg may be connected to a positioner support. The positioner support may lock the movement leg in place, cause movement of the movement leg, prevent rotation of the movement leg, or a combination thereof. The movement leg may be movable relative to the rail clamp, the adjustment arm, or both. The movement leg may be in contact with the adjustment arm. The movement leg may be free of a direct connection (e.g., a bottom) with the rail clamp, the adjustment arm, or both. A top of the movement leg may include a chamfer. The chamfer may extend at an angle relative to a rear side, a locking portion or both. Preferably, the chamfer extends from the rear side towards the locking portion. The chamfer may extend at an angle of less than 90 degrees, about 70 degrees or less, about 50 degrees or less, or about 40 degrees or less. The chamfer may extend at an angle of about 24 degrees or more or about 35 degrees or more. The angle of the chamfer and the angle of the teeth may be substantially equal (i.e., within about 5 degrees or less, about 3 degrees or less, or about 1 degree or less). The movement leg may be moved in an axial direction along an adjustment device (e.g., an axial direction relative to the positioner support). The movement leg may be supported against the adjustment arm. The movement leg may slide along the adjustment arm. The movement leg may only be supported by the positioner support. The movement leg may be supported by both the positioner support and the adjustment arm. The movement leg may assist in axially adjusting the bed clamp. The movement leg may be vertically static. The movement leg may include one or more adjustment devices that allow a contact leg to move relative to the movement leg.

The one or more adjustment devices may function to axially move the bed clamp, vertically move all or a portion of the bed clamp, or both. The one or more adjustment devices may be tightened and loosened. The one or more adjustment devices may be threaded, locked, unlocked, connected to a fastener, free of a fastener, or a combination thereof. The one or more adjustment devices may be a detent, fastener, nut, bolt, or a combination thereof. The one or more adjustment devices may be adjusted without the use of any tools. The adjustment devices may require tools to create an adjustment. The one or more adjustment devices may be a bolt and nut. The one or more adjustment devices may be a screw. The adjustment devices may form a cantilever connection. The adjustment devices may slide to assist in adjusting the bed clamp. The adjustment devices may axially move to create an adjustment. The adjustment devices may fit within one or more adjustment cavities.

The one or more adjustment cavities may receive one or more adjustment devices so that one or more portions of the bed clamp may be adjusted. The one or more adjustment cavities may only permit axial movement through the adjustment cavity and may prevent lateral movement (e.g., in a movement other than along an axis of the adjustment device (e.g., vertically or side to side)). The one or more adjustment cavities may allow for both longitudinal and lateral movement. For example, the adjustment cavity may be elongated in one dimension (e.g., oval, or ellipse) so that the adjustment device, the contact leg, or both may be movable in the elongated direction. The one or more adjustment cavities may allow for vertical movement. The adjustment cavities may extend through the movement leg and the contact leg. The adjustment cavities may only be in the movement leg, only in the contact leg, or be in both the movement leg and the contact leg. Some adjustment cavities may be located only in the movement leg. Some adjustment cavities may be located in both the movement leg and contact leg. A plurality of adjustment cavities may be located in the movement leg, the contact leg, or both. Some of the adjustment cavities may receive adjustment devices that axially adjust, some adjustment cavities may receive adjustment devices that vertically adjust, or both. The movement leg may include one or more adjustment cavities or a plurality of adjustment cavities. Preferably, the movement leg includes three adjustment cavities and each adjustment cavity receives an adjustment device. The contact leg may include one or more adjustment cavities or a plurality of adjustment cavities. Preferably, the contact leg may include two adjustment cavities and each adjustment cavity may receive an adjustment leg. A positioner support may extend through each adjustment cavity and a locking portion may prevent movement of the movement leg relative to the contact leg.

The locking portion may function to prevent movement of one or more portions of the clamp relative to another portion of the clamp, the bed, the bed flange, a rail, or a combination thereof. Preferably, the locking portions prevent the contact leg from moving relative to the movement leg. The locking portions may prevent axial movement, lateral movement, longitudinal movement, vertical movement, or a combination thereof. A locking portion and a gripping portion may include the same features, may be identical in configuration, or both. A locking portion may connect to another locking portion to prevent movement of one part of the clamp relative to another part of the clamp. A first locking portion may directly contact a second locking portion. One or more locking portions may be located on the movement leg and one or more locking portions may be located on the contact leg. The locking portions may be complementary in shape so that when the locking portions are in contact the locking portions prevent movement. The locking portions may be substantially planar to each other. The locking portions may have a surface or a region that is sinusoidal, jagged, a roughened surface, contoured, or a combination thereof. The locking portions may be a mirror image to an adjacent locking portion. The locking portions may have one or more teeth. The locking portions may have peaks and valleys and when a peak of the movement leg, contact leg, or both falls into a valley of the adjacent movement leg, contact leg, or both a position of the movement leg may be locked relative to the contact leg. The locking portions may prevent movement in a direction of movement. For example, the locking portions may prevent the contact leg from moving up and down (e.g., along a vertical plane) relative to the movement leg.

The contact leg may function to create a connection with a bed, a bed flange, or both. The contact leg may contact one or more surfaces, two or more surfaces, a plurality of surfaces, or a combination thereof of a bed, a bed flange, or both. Preferably, the contact leg contacts at least two surfaces of a bed, bed flange, or one surface of a bed and one surface of a bed flange. The contact leg may include one or more locking portions. The one or more locking portions of the contact leg may form a fixed connection, a movable connection, or both with a locking portion of a movement leg. The contact leg may include a plurality of teeth. The contact leg may include a contact portion.

The one or more contact portions may function to form a connection with a bed, a bed flange, or both. The one or more contact portions may have two or more contact locations with a portion of the bed. Preferably, the contact portion extends under the bed and is in contact with the bed and a bed flange so that when the clamp is closed the bed flange and a rail are held together. The one or more contact portions may have one or more portions, sides, or both that are in contact with the bed, bed flange, or both. The one or more contact portions may have a portion that is located within a same plane as the locking portion. The one or more contact portions may have one or more portions that extend away from the plane of the locking portion. For example, the contact portions may have an arcuate side, an angled side, or both that extend out of the plane of the locking portion. The one or more contact portions may have one or more arcuate sides, one or more angled sides, or both. Preferably, the one or more contact portions include an arcuate side that is located opposite an angled side.

The one or more arcuate sides functions to create contact with the bed, the bed flange, or both. The one or more arcuate sides may hold the bed, bed flange, or both into contact with a rail. The one or more arcuate sides may support the rail, the bed, or both. The one or more arcuate sides may extend outward from a plane including the locking portion. The one or more arcuate sides may extend outward about 1 mm or more, about 3 mm or more, about 5 mm or more, about 7 mm or more, about 1 cm or more, about 2 cm or more, or about 3 cm or more from a plane including the locking portion. The one or more arcuate sides may extend outward about 10 cm or less, about 7 cm or less, or about 5 cm or less from a plane including the locking portion. The one or more arcuate sides have one or more locations of contact and preferably two or more locations of contact with the bed. The arcuate sides may be in contact with the bed (e.g., a horizontal wall at a horizontal contact location) and the bed flange (e.g., a vertical wall at a vertical contact location). The horizontal contact location may be a contact location on one or more horizontal surfaces. The vertical contact location may be a contact location on one or more vertical surfaces. The arcuate sides may be in contact with a horizontal wall and a vertical wall that are substantially at a 90 degree angle to each other (e.g., within 5 degrees or less, within 3 degrees or less, or within 1 degree or less). The contact portion may have an arcuate contact portion. The contact portion may be radiused. The radius may be substantially large that the arcuate side contacts both the bed and the bed flange at the same time. The radius may be about 2 mm or more, about 5 mm or more, about 7 mm or more, or about 1 cm or more. The radius may be about 5 cm or less, about 3 cm or less, or about 2 cm or less. The arcuate side may terminate at the locking portion, a rear side of the locking portion, an angled side, or a combination thereof.

The one or more angled sides may function to contour the contact leg so that the contact leg fits within a recess in a bed, between the bed and a bed flange, or both. The one or more angled sides may mirror a shape of the movement leg. The one or more angled sides may contact a chamfer of the movement leg to restrict movement in one direction. The one or more angled sides may be complementary in shape to the chamfer on the movement leg. The one or more angled sides may have a shape that mirrors the shape of the teeth. The one or more angled sides may extend at an angle that is the same angle as those of the teeth. The one or more angled sides may have an angle of about 120 degrees or less, about 110 degrees or less, or about 100 degrees or less when measured from a first side of an angled side to a second side of an angled side. The one or more angled sides may extend at an angle of about 50 degrees or more, about 75 degrees or more, or about 90 degrees or more when measured from a first side of an angled sides to a second side of an angled side. A surface of each angled side (e.g., upper surface, lower surface, or both) may extend at an angle relative to a rear surface of the locking portion. A surface of the angled sides may extend at an angle of about 90 degrees or more, about 100 degrees or more, about 125 degrees or more, or about 135 degrees or more relative to a rear surface of the locking portion. A surface of each angled sides may extend at an angle of about 180 degrees or less, about 165 degrees or less, or about 150 degrees or less relative to a rear surface of the locking portion. The angled sides may terminate at a point. Each surface of the angled sides may converge as the surfaces extend away from the rear side of a locking portion.

The rear side may be located opposite a locking portion. The rear side may be flat, planar, or both. The rear side may be free of contact with any other surfaces. The rear side of a movement leg is located opposite a rear side of a contact leg. When the movement leg and the contact leg are in contact the rear side of the movement leg and the rear side of the contact leg may be generally parallel. The clamp may be supported by one or more support arms.

The one or more support arms may function to prevent rotation of the clamp. The one or more support arms may maintain a connection between the bed (or bed flange) and a rail. The one or more support arms may create contact between the clamp and a side wall of a vehicle or bed. The one or more support arms may be adjustable. The one or more support arms may extend cantilever from a rotation arm. The one or more support arms may include a positioner adjuster, a positioner support, a positioner stop, or a combination thereof.

The one or more positioner adjusters may function to move or allow a positioner support to move so that the clamp is aligned with the bed, bed flange, rail, a side of a vehicle, a side of a bed, or a combination thereof. The one or more positioner adjusters may function to lock a positioner stop into contact with a bed so that rotation of the clamp is prevented. The one or more positioner adjusters may be axially movable. The one or more positioner adjusters may be threaded. The one or more positioner adjusters may be locked in a detent, steps, stops, or a combination thereof so that a position of the positioner support may be moved and then locked into a position. The one or more positioner adjusters may be a fastener. Preferably the positioner adjuster is a nut that is connected to one or more positioner supports.

The one or more positioner supports may function to prevent movement or rotation of a clamp once the positioner adjuster and the positioner support is adjusted to a desired location. The one or more positioner supports may be directly connected to the rotation arm. The one or more positioner supports may extend cantilever from the rotation arm. The one or more positioner supports may be movable relative to the rotation arm, through the rotation arm, or both. The one or more positioner supports may extend from a side of the clamp where the bed clamp is located. The one or more positioner supports may be lengthened or shortened by moving the positioner support relative to the rotation arm or through the rotation arm. The positioner support may be axially movable along a longitudinal axis of the positioner support. The one or more positioner supports may be threaded. The one or more positioner supports may be movable into contact with a wall of a vehicle, a wall of the bed, or both and then locked in place by a positioner adjuster. The one or more positioner supports may be a screw or a bolt. The one or more positioner supports may include a positioner stop at one or both ends.

The one or more positioner stops may function to contact a wall of a vehicle, a bed of a vehicle, or both to restrict movement of the clamp, prevent rotation of the clamp, or both. The one or more positioner stops may prevent damage to the side of the bed, the side of the vehicle, or both. The one or more positioner stops may be made of or include rubber, silicone, an elastomer, a plastic, a polymer, or a combination thereof. The one or more positioner stops may have an increased surface area when compared to an end of the positioner support. The one or more positioner stops may have an increased coefficient of friction when compared to an end of the positioner support. The one or more positioner stops may be used with one or more positioners, located proximate to one or more positioners, or both.

The one or more positioners may function to determine or create a distance between the rail and the bed, the rail and the bed flange, or both. The one or more positioners may maintain a rail on a first side parallel to a rail on a second side. The one or more positioners may function to assist in locking the bed, bed flange, or both to the rail. The one or more positioners may create a locking force between the rail and the bed, the bed flange, or both. The one or more positioners may assist in increasing an amount of force applied by the clamp. For example, the positioners may be adjusted after the clamp is locked in place so that the positioner creates a force against the rail clamp, the bed clamp, or both. The positioners may be a set screw, bolt, threaded member, elastomeric piece, metal piece, or a combination thereof that crates a gap or a distance between the bed and the rail. There may be one or more positioners located proximate to each of the clamps. For example, there may be a positioner on a first side of the clamp and a positioner on a second side of each clamp. The positioners may assist in locking the rails to the bed of a vehicle.

The vehicle may be any vehicle that includes a bed, an open space that may be covered, or both. The vehicle preferably is a pick-up truck. The bed may be any size bed that can hold contents. The bed may be 4 feet or more, 6 feet or more, or 8 feet or more. The bed may include one or more bed flanges. The bed flange may include an open space. The flange may extend into the bed. The flange may extend towards an opposing wall of a bed and towards a bottom of the bed. The bed flange may be large enough to receive one or more clamps. The bed flange may be a continuous opening. The bed flange may be a plurality of openings. The bed flange may support a rail so that the cover may be moved between an open position and a closed position. Each bed flange may support a rail and each rail may support a side of the cover.

FIG. 1A illustrates a tonneau system 2. The tonneau system 2 includes a tonneau cover 3 made up of a plurality of tonneau sections 4. The tonneau system 2 in a closed position 100 so that the bed 152 of a vehicle 150 is fully covered.

Figure 1B:
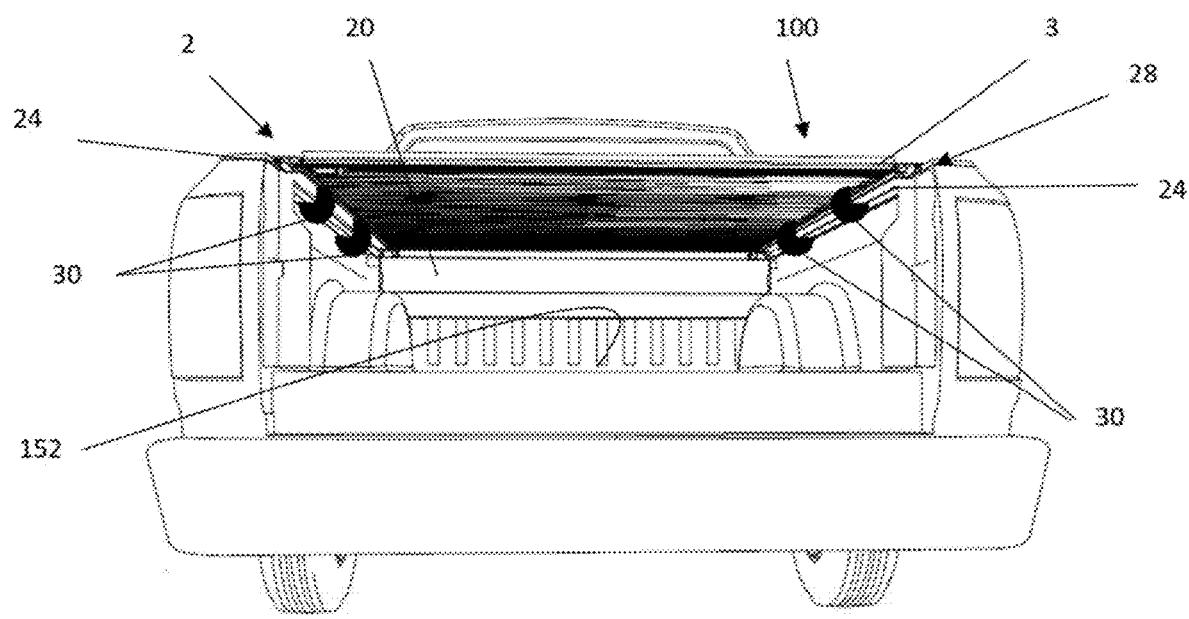
FIG. 1B is a rear perspective view of a vehicle with a tonneau system in a closed position with clamps connecting a rail to a bed.

FIG. 1B illustrates a view under the cover 3 of the tonneau system 2 when the bed 152 is covered. A canister 20 is located under the tonneau cover 3 and connected to the bed 152 so that when the tonneau cover 3 is moved from the closed position 100 to a stored position (not shown) the cover 3 is completely housed within the canister 20. A plurality of clamps 30 connect the rails 28, which include a roller tracks 24, of the tonneau cover 3 to the bed 152 of the vehicle 150.

Figure 2:
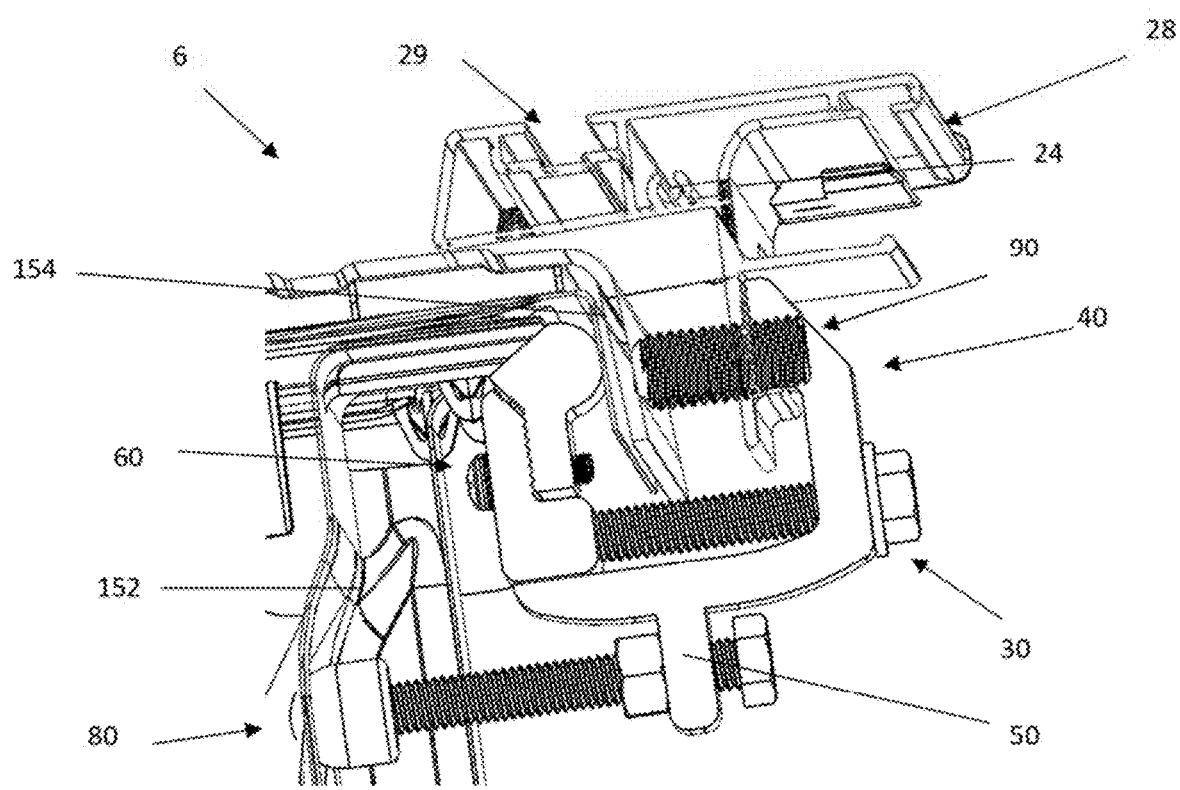
FIG. 2 is a side perspective view of a clamp connecting a rail to a bed flange.

FIG. 2 is a bottom perspective view of a clamp 30 in a locked state 6 connecting a rail 28 to a bed flange 154 of a bed 152. The clamp 30 includes a rail clamp 40 that contacts the and holds the rail 28. Opposite the rail clamp 40 is a bed clamp 60 that contacts the bed flange 154 of the bed 152. A positioner 90 is located proximate to the rail clamp 40 to maintain a position of the roller track 24 of the rail 28 relative to the bed rail 154 so that opposing roller tracks 24 are spaced a predetermined distance a part that is equal to the width of the tonneau cover (not shown). The clamp 30 includes a support arm 80 connected to a rotation arm 50 that assist in positioning the clamp 30 relative to the bed 150 and to prevent rotation and/or tipping of the clamp 30. The support arm 80 further provides support that prevents the rail 28 from moving relative to or rotating relative to the bed flange 154 when an accessory (not shown) is secured to the rail 28 or the cover (not shown) via an accessory port 29.

Figure 3:
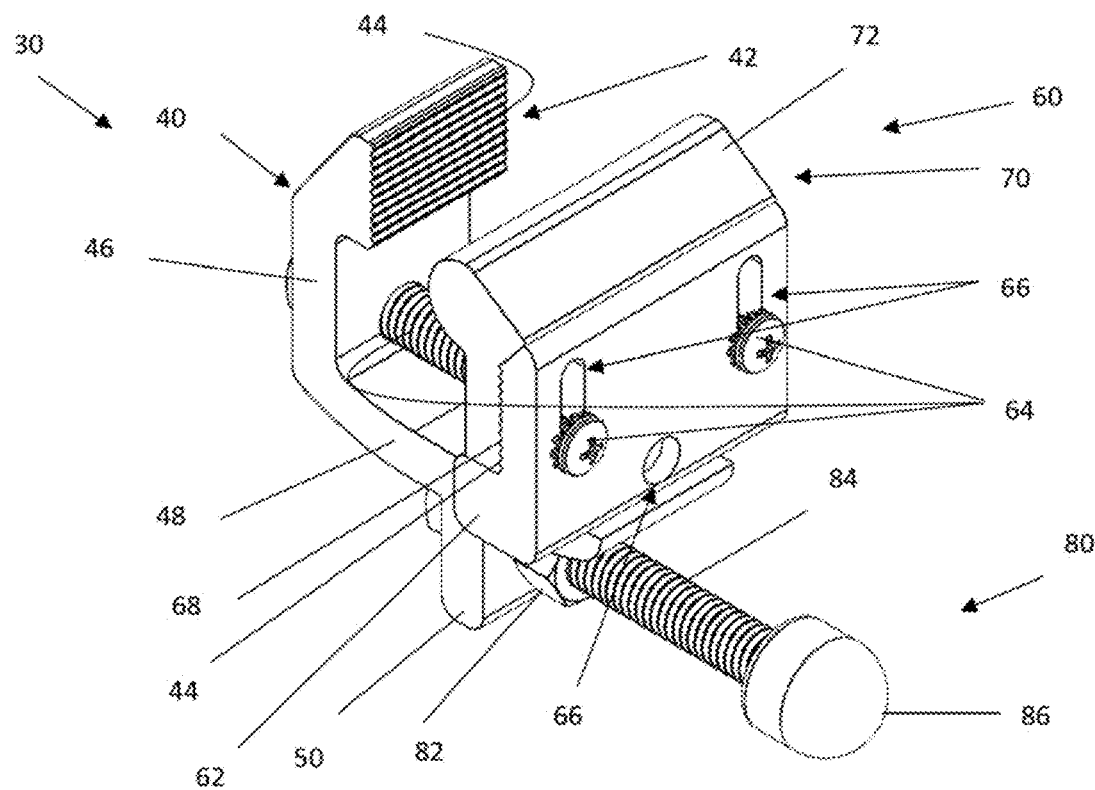
FIG. 3 is perspective view of a clamp.

FIG. 3 is a rear perspective view of a clamp 30. The clamp 30 includes a rail clamp 40 and a bed clamp 60 that work together to clamp a roller track (not shown) to a bed 152. The rail clamp 40 includes a gripping portion 42 having a plurality of teeth 44. The gripping portion 42 is connected to and extends from an extension arm 46 that is in communication with an adjustment device 64. The extension arm 46 is connected to an adjustment arm 48, which is also connected to a rotation arm 50. The adjustment device 64 that extends between the extension arm 46 of the rail clamp 40 and the bed clamp 60 adjusts a distance between the extension arm 46 and the bed clamp 60. The bed clamp 60 includes a movement leg 62 and a contact leg 70. The movement leg 62 includes adjustment devices 64 that extend through adjustment cavities 66 so that the contact leg 70 is movable relative to the movement leg 62. The movement leg 62 also includes an adjustment cavity 66 that receives an adjustment device 64 for moving the bed clamp 60 relative to the rail clamp 40. The movement leg 62 and the contact leg 70 each include a locking portion 68 with teeth 44 that lock the movement leg 62 and the contact leg 70 together. A contact portion 72 extends outward from the contact leg 70 towards the rail clamp 40. A support arm 80 is connected to the rotation arm 50 to prevent rotation or maintain alignment of the clamp 30 when the clamp 30 is connected. The support arm 80 includes a positioner adjuster 82 that is movable along the positioner support 84 to move the clamp 30. The support arm 80 terminates at a positioner stop 86 that may be in contact with the bed (not shown).

Figure 4:
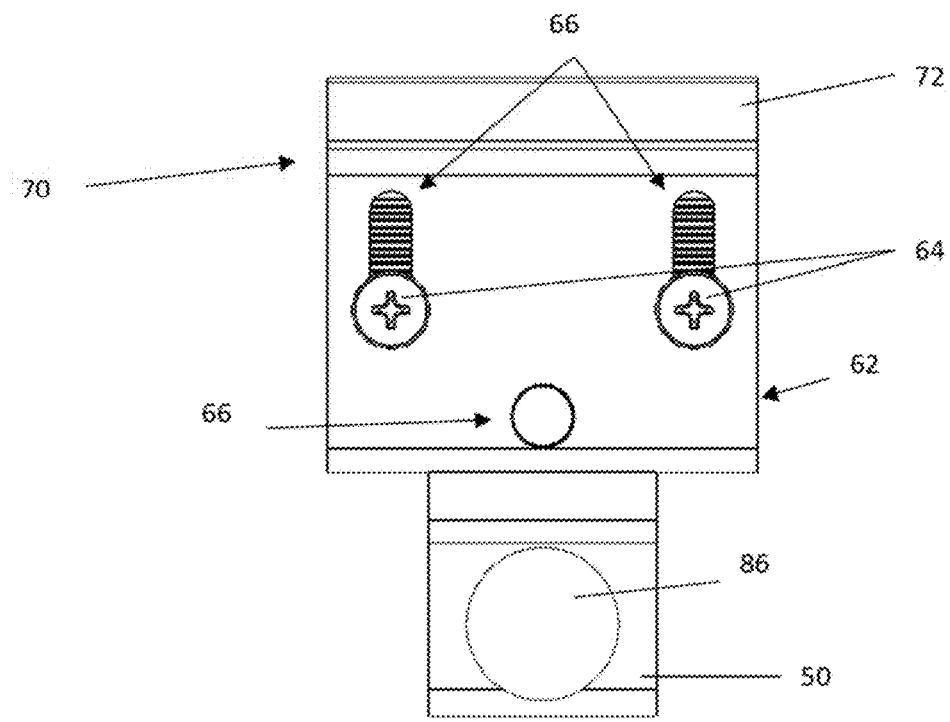
FIG. 4 is a front view of a clamp.

FIG. 4 is a plan view of a movement leg 62, a contact leg 70, and rotation arm 50. The movement leg 62 includes a plurality of adjustment cavities 66 that receive adjustment devices 64 so that the movement leg 62 is adjustable. The movement leg 62 is connected to a contact leg 70 by some of the adjustment devices 64. The contact leg 70 includes a contact portion 72 extending form the contact leg 70. The rotation arm 50 extends below the movement leg 62 with a positioner stop 86 extending from the rotation arm 50.

Figure 5:
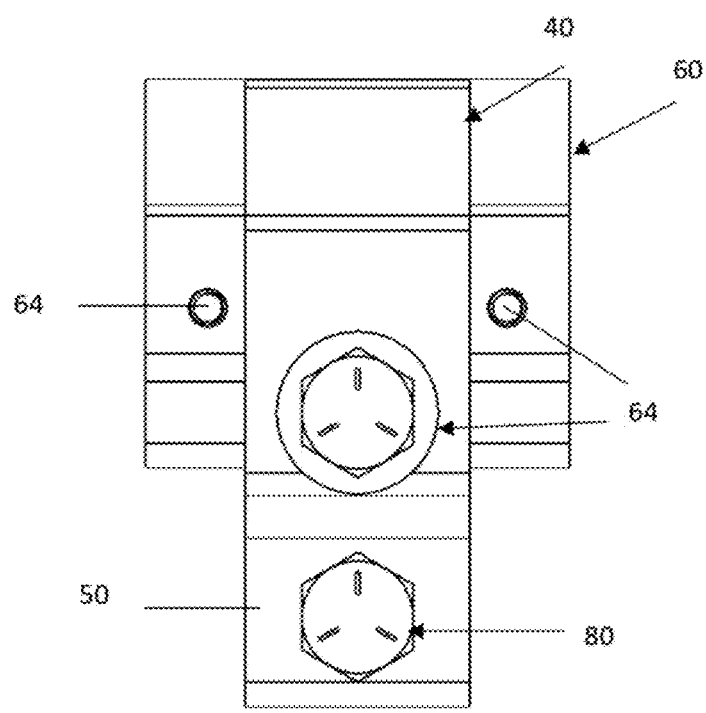
FIG. 5 is a rear view of a clamp.

FIG. 5 is a plan view of a rail clamp 40 and a bed clamp 60. The rail clamp 40 includes an adjustment device 64 with a rotation arm 50 extending below the rail clamp 40. The rotation arm 50 is connected to a support arm 80. The bed clamp 60 also includes adjustment devices 64.

Figure 6A:
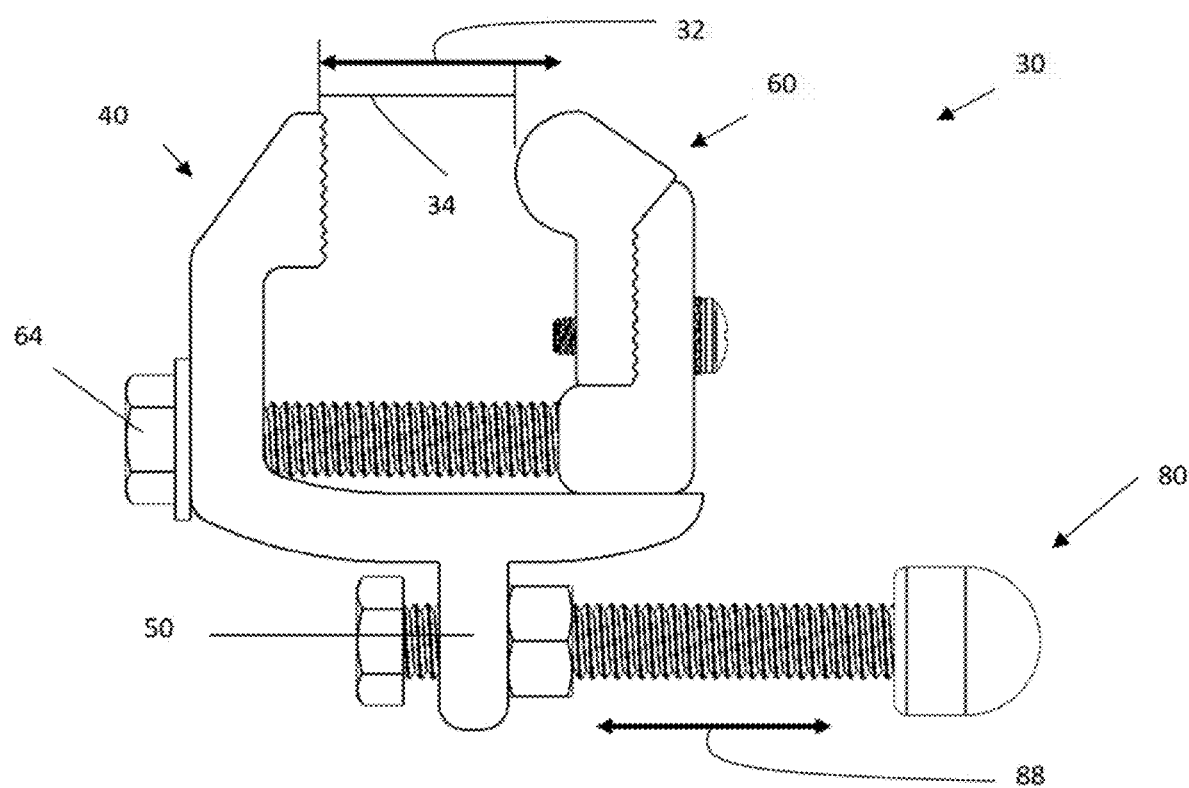
FIG. 6A is a side view illustrating horizontal adjustment of a clamp.

FIG. 6A is a side view of a clamp 30 being horizontally adjusted (e.g., longitudinally). The clamp 30 includes a rail clamp 40 and a bed clamp 60 that are spaced apart a distance 34. The bed clamp 60 is movable in the direction 32 as the adjustment device 64 moves so that the distance 34 increases and decreases. The support arm 80 extends from the rotation arm 50 and the support arm 80 is adjustable in the directions 88 by movement of the support arm 80.

Figure 6B:
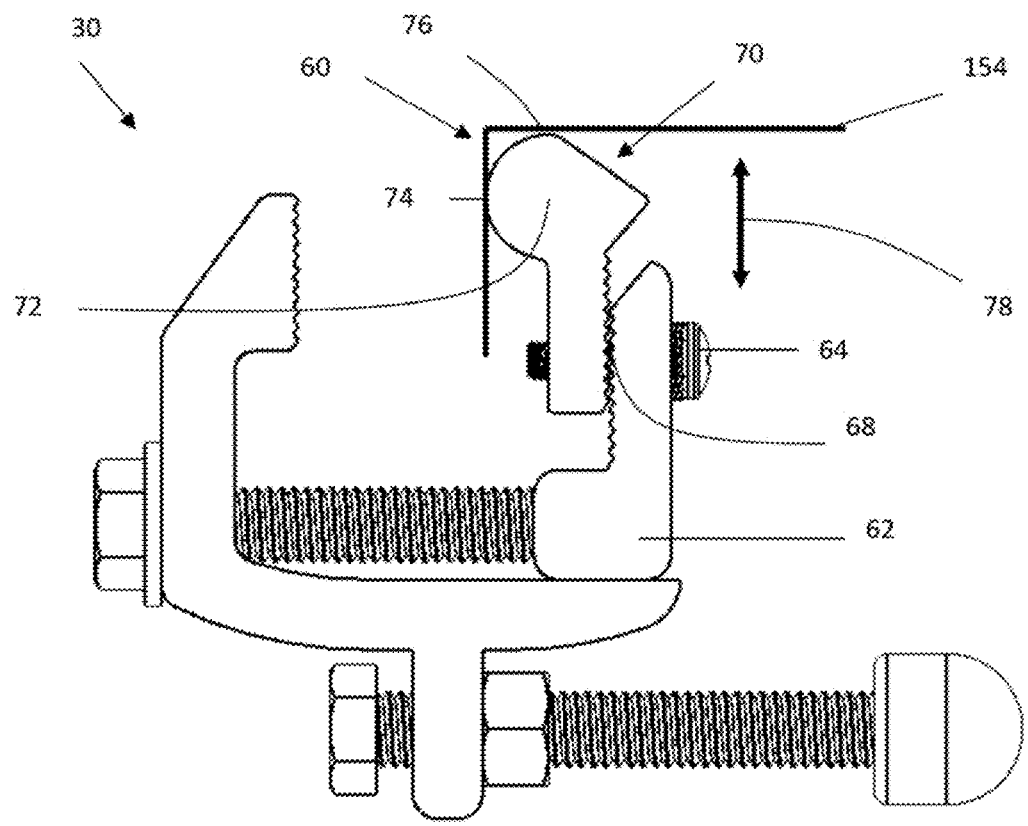
FIG. 6B is a side view illustrating vertical adjustment of a clamp.

FIG. 6B is a side view a bed clamp 60 of a clamp 30 being vertically adjusted. The bed clamp 60 includes a movement leg 62 and a contact leg 70 that are connected by adjustment devices 64. The adjustment devices 64 allow the contact portion 72 of the contact leg 70 to be movable in the direction 78 into contact with a bed flange 154 so that the contact portion 72 contacts the bed flange 154 at a vertical contact location 74 and a horizontal contact location 76. The adjustment devices 64 move the locking portions 68 into to contact to prevent movement and allow the locking portions 68 to be separated to allow for movement.

Figure 7:
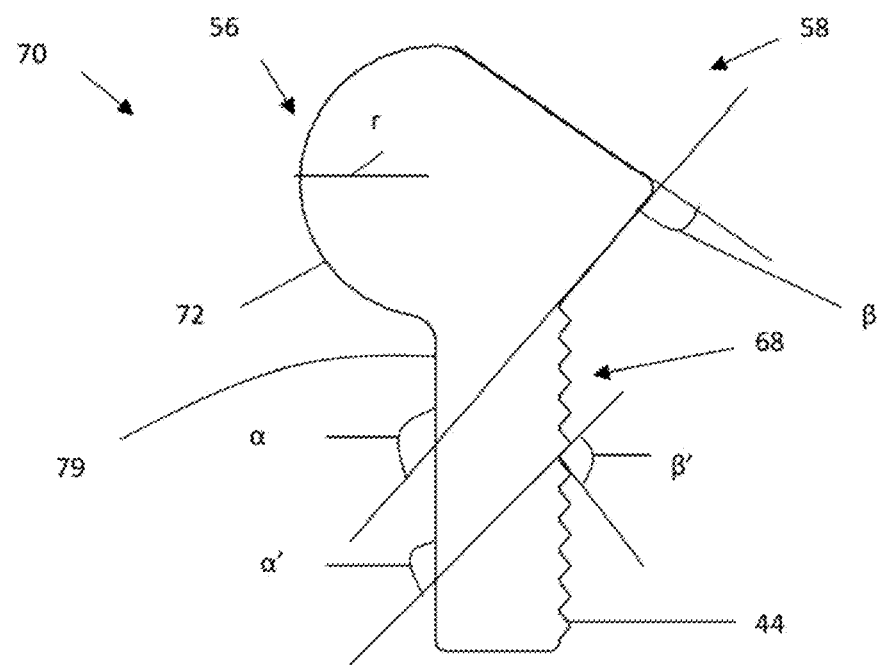
FIG. 7 is side view of a contact leg.

FIG. 7 is a side view of a contact leg 70 including a contact portion 72 and a locking portion 68 with a plurality of teeth 44. The teeth 44 extend at an angle ($\alpha'$) relative to a rear side 79 of the locking portion 68 and an angle between a bottom of one tooth and a top of an adjacent tooth extend at an angle of ($\beta'$). The contact portion 72 includes an arcuate side 56 having a radius (r) and an angled side 58. The angled side 58 has a bottom surface that extends at an angle ($\alpha$) relative to a rear side 79 of the locking portion 68. The angled side 58 has a top surface that extends at an angle ($\beta$) relative to the bottom surface.

Figure 8:
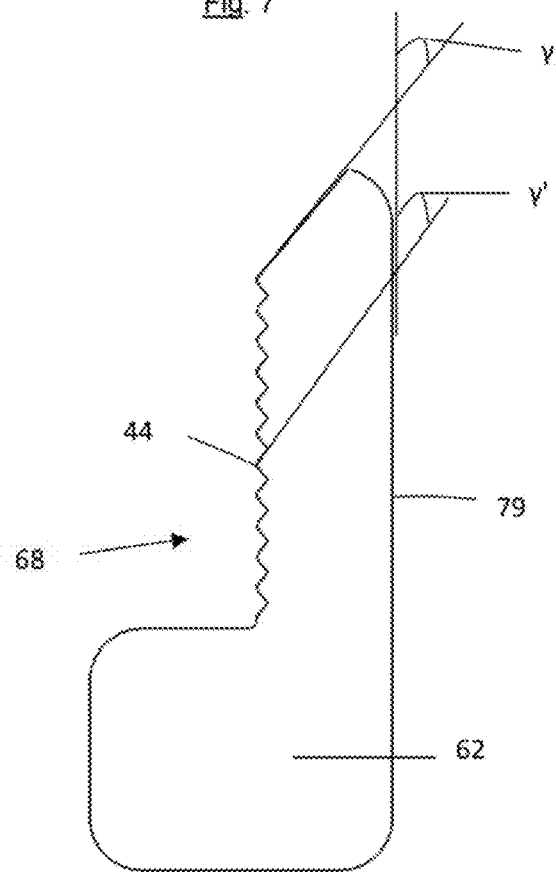
FIG. 8 is a side view of a movement leg.

FIG. 8 is a side view of a movement leg 62. The movement leg 62 includes a locking portion 68 with a plurality of teeth 44. The plurality of teeth 44 have an upper surface that extends at an angle ($\gamma'$) relative to a rear side 79 of the locking portion 68. The upper surface of the locking portion 68 extends at an angle ($\gamma$) relative to the rear side 79 of the locking portion 68. The upper surface of the locking portion of the movement leg 62, as shown, is complementary in shape to a bottom surface of the angled side of the contact portion 72 of FIG. 7.

Figure 9:
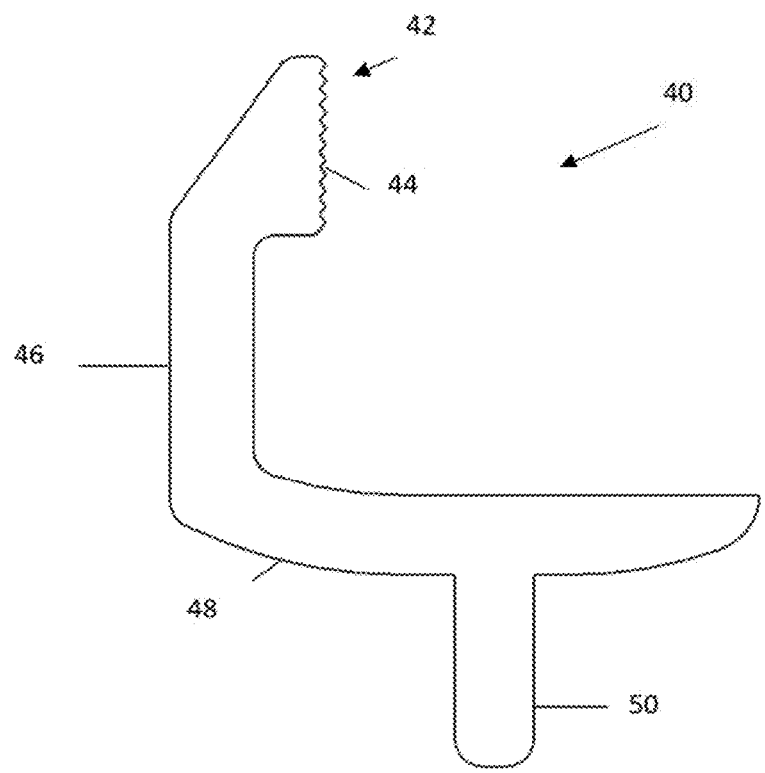
FIG. 9 is a side view of a rail clamp.

FIG. 9 is a side view of a rail clamp 40. The rail clamp 40 includes a gripping portion 42 including a plurality of teeth 44. The gripping portion 42 extends from an extension arm 46 which is located between the adjustment arm 48 and the extension arm 46. A rotation arm 50 extends from the adjustment arm 48.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. Unless otherwise stated, a teaching with the term "about" or "approximately" in combination with a numerical amount encompasses a teaching of the recited amount, as well as approximations of that recited amount. By way of example, a teaching of "about 100" encompasses a teaching of within a range of 100+/−15.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

2 Tonneau System
3 Tonneau cover
4 Tonneau Section
6 Locked state
20 canister
22 track
24 Roller track
26 Direction of movement
28 rail
29 Accessory Port
30 Clamp
32 Clamp movement
34 Space
40 Rail clamp
42 Gripping portion
44 teeth
46 Extension arm
48 Adjustment arm
50 Rotation arm
56 Arcuate side
58 Angled side
60 Bed clamp
62 Movement leg
64 Adjustment device
66 Adjustment cavity
68 Locking portion
70 Contact leg
72 Contact portion
74 Vertical contact location
76 Horizontal contact location
78 Bed clamp adjustment
79 Rear Side
80 Support Arm
82 Positioner adjuster
84 Positioner support
86 Positioner stop
88 Support movement
90 Positioner
100 Closed position
110 Stored position
150 vehicle
152 Bed
154 Bed flange

What is claimed is:

1. A clamp comprising:
   a. one or more rail clamps that are configured to contact one or more rails of a tonneau system;
   b. one or more bed clamps that are configured to contact a bed flange of a bed of a vehicle, the one or more bed clamps being movable relative the one or more rail clamps so that a space between the one or more rail clamps and the one or more bed clamps can be increased and decreased, the one or more bed clamps each including:
      i. a contact portion that when in a locked position has both a vertical contact location where the contact portion contacts a vertical portion of the bed flange and a horizontal contact location where the contact portion contacts a horizontal portion of the bed flange; and
      ii. a movement leg in communication with the contact portion, the movement leg supporting the contact portion so that the contact portion is vertically movable relative to the movement leg.

2. The clamp of claim 1, wherein the contact portion is free of rotational movement relative to the movement leg; the movement leg, the contact portion, or both are free of any joints or connections that rotationally move; or both.

3. The clamp of claim 1, wherein the contact portion extends from a contact leg and the contact leg connects to the movement leg.

4. The clamp of claim 3, wherein the contact leg includes a locking portion and the movement leg includes a locking portion that forms a complementary fit with the contact portion of the contact leg to prevent movement of the contact leg relative to the movement leg.

5. The clamp of claim 3, wherein one or more adjustment devices extend between and connect the movement leg to the contact leg.

6. The clamp of claim 5, wherein the movement leg, the contact leg, or both include one or more adjustment cavities so that a position of the contact leg is adjustable relative to the movement leg.

7. The clamp of claim 4, wherein the locking portion of the contact leg and the locking portion of the movement leg include a plurality of teeth that connect together to prevent movement.

8. The clamp of claim 1, wherein a top of the movement leg has a chamfer that extends at an angle.

9. The clamp of claim 8, wherein the angle is about 70 degrees or less relative to a rear side of a locking portion, and the rear side of the locking portion is located opposite a plurality of teeth on the locking portion.

10. The clamp of claim 1, wherein the contact portion includes an arcuate side having a radius.

11. The clamp of claim 1, wherein the contact portion includes an angled side having a bottom surface and an upper surface that extend at an angle relative to each other.

12. The clamp of claim 11, wherein the angle is an acute angle.

13. The clamp of claim 1, wherein the contact portion is connected to a locking portion and a part of the contact portion extends outward from a plane of the locking portion.

14. The clamp of claim 1, wherein the one or more rail clamps and the one or more bed clamps are connected by one or more adjustment devices.

15. The clamp of claim 14, wherein the one or more bed clamps move towards or away from the one or more rail clamps by movement of the one or more adjustment devices.

16. The clamp of claim 14, wherein the one or more bed clamps are only connected to the one or more rail clamps by the one or more adjustment devices.

17. The clamp of claim 1, wherein one or more rotation arms extend from the one or more rail clamps, the one or more bed clamps, or both.

18. The clamp of claim 17, wherein one or more support arms are connected to and extend from the one or more rotation arms.

19. The clamp of claim 18, wherein the one or more support arms include one or more positioner adjusters and one or more positioner supports that adjust the one or more support arms to prevent rotation of the clamp, to orient the clamp relative to the bed flange, a rail, or both.

20. The clamp of claim 18, wherein the one or more support arms include one or more positioner stops that assist in holding the clamp, the one or more support arms, or both in place once a position of the clamp is set.

\* \* \* \* \*